United States Patent
Horowitz et al.

(10) Patent No.: US 12,425,334 B2
(45) Date of Patent: Sep. 23, 2025

(54) LINK AGGREGATION IN INFINIBAND NETWORKS

(71) Applicant: MELLANOX TECHNOLOGIES, LTD., Yokneam (IL)

(72) Inventors: Adi Horowitz, Haifa (IL); Omri Kahalon, Yehud (IL); Gal Shalom, Givat-Avni (IL); Rabia Loulou, Nazareth (IL); Aviad Yehezkel, Yokneam Ilit (IL); Matty Kadosh, Hadera (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 318 days.

(21) Appl. No.: 18/162,174

(22) Filed: Jan. 31, 2023

(65) Prior Publication Data

US 2024/0259298 A1 Aug. 1, 2024

(51) Int. Cl.
| | |
|---|---|
| *G06F 15/173* | (2006.01) |
| *H04L 45/24* | (2022.01) |
| *H04L 61/103* | (2022.01) |
| *H04L 101/668* | (2022.01) |

(52) U.S. Cl.
CPC .......... *H04L 45/245* (2013.01); *H04L 61/103* (2013.01); *H04L 2101/668* (2022.05)

(58) Field of Classification Search
None
See application file for complete search history.

(56) References Cited

U.S. PATENT DOCUMENTS

| | | | | |
|---|---|---|---|---|
| 8,787,149 | B1* | 7/2014 | Ramanathan | H04L 45/58 370/216 |
| 2013/0339475 | A1* | 12/2013 | Kataria | H04L 45/46 709/217 |
| 2020/0204492 | A1* | 6/2020 | Sarva | H04L 47/125 |
| 2020/0344166 | A1* | 10/2020 | Roberts | H04L 49/70 |
| 2022/0210070 | A1* | 6/2022 | Brar | H04L 49/70 |
| 2024/0214294 | A1* | 6/2024 | Miriyala | H04L 43/08 |

\* cited by examiner

*Primary Examiner* — Phuoc H Nguyen
(74) *Attorney, Agent, or Firm* — Hogan Lovells US LLP (57) ABSTRACT

Systems and methods herein are for one or more processing units of a subnet manger (SM) to communicate configuration information with at least one subnet management agent (SMA) that is associated with at least one switch and with a host machine, the configuration information to enable the at least one switch to configure a forwarding table based in part on a mapping of at least one virtual network address to physical network addresses of two or more physical ports of the host machine, and the configuration information to enable the host machine to communicate with other host machines using the at least one switch and the at least one virtual network address.

18 Claims, 7 Drawing Sheets

LINK AGGREGATION IN INFINIBAND NETWORKS

TECHNICAL FIELD

At least one embodiment pertains to link aggregation (LAG) in InfiniBand (IB) networks. For example, a subnet manger (SM) and a subnet management agent (SMA) are used to establish a virtual network address mapped to physical network addresses of physical IB ports.

BACKGROUND

Link aggregation (LAG) in ethernet networks can be configured and administrated by Link Aggregation Control Protocol (LACP). This protocol allows a host having a network device to negotiate a bonding, with a peer, of two or more of its physical ports that are network ports. The bonding of such physical ports may be under a grouping referred to as link aggregation (LAG). The peer can be a switch that also supports LACP. LACP packets are sent periodically between the peers as part of establishing or updating the ethernet LAGs. Further, these LACP packets may be sent to support monitoring states of the ethernet ports that support ethernet LAG. The LACP packets may be also used to add and remove physical ports from the ethernet LAG. Under an LACP mode, a port-channel may be created to communicate the LACP packets. A new or existing ethernet LAG may be configured via such an LACP channel. For example, an ethernet switch can configure its forwarding tables according to the configuration provided via the LACP packets and can address load-balancing based on a hash calculation within an ethernet network.

DETAILED DESCRIPTION

Figure 1:
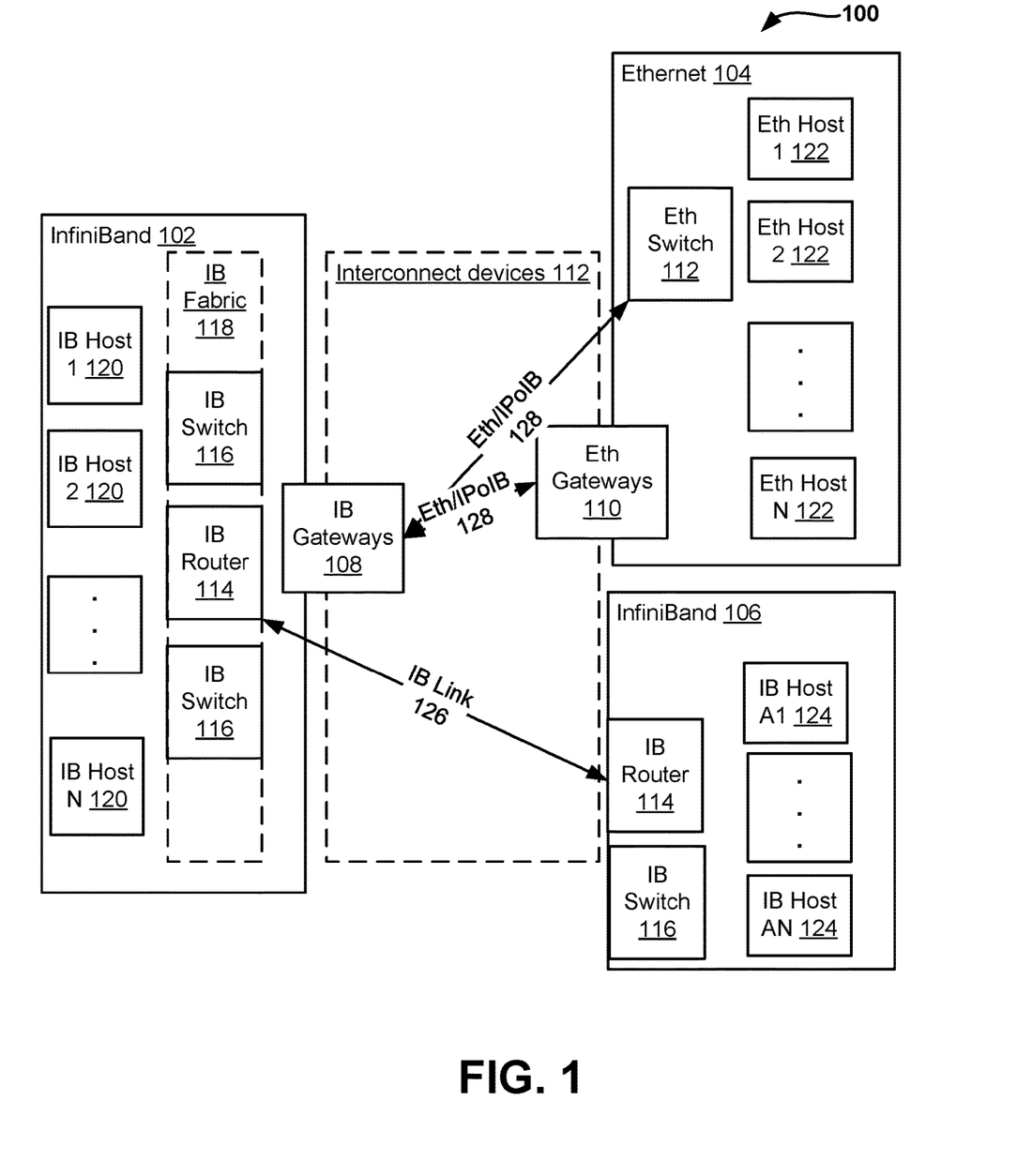
FIG. 1 illustrates a system that is subject to InfiniBand (IB) link aggregation (LAG), according to at least one embodiment.

In at least one embodiment, FIG. 1 illustrates a system 100 that is subject to InfiniBand (IB) link aggregation (LAG), as detailed herein. The system 100 also supports interfacing between an InfiniBand (IB) network 102 and an ethernet network 104, alongside other IB networks 106. For an ethernet network 104, load balancing and high availability functions may be enabled by ethernet LAG. For establishing and modifying such an ethernet LAG, LACP may be used. However, such LACP is not available in IB networks 106. Further, while LACP may also be used to verify connectivity in an ethernet LAG at different times in operation, this is different from the IB network 106 that relies on a subnet manager (SM) and subnet management agents (SMAs) to coordinate network changes among different IB devices.

For example, in the ethernet network 104 of FIG. 1, LACP allows ethernet hosts 1-N 122 having a network device to negotiate a bonding of two (or more) of its ports with a peer, such as an ethernet switch 112 that also supports LACP. LACP packets are periodically sent between the peers 112, to monitor a state of an ethernet port that is configured for ethernet LAG on one or more of the ethernet hosts 1-N 122. LACP packets are also used to allow addition to and removal of ethernet ports from the ethernet LAG. A new ethernet LAG can be configured (or an existing ethernet LAG can be modified) via an LACP channel. An ethernet switch 112 may be responsible to configure its internal forwarding tables based on the LACP packets, to provide load-balancing based on a hash calculation.

However, because LACP cannot be used directly with an IB network 102, such an approach is not usable in IB networks. In one example, because an IB network 102 includes SMs and SMAs, such as illustrated and discussed with respect to at least FIGS. 2-4, these aspects are used, instead, to monitor link states of IB ports within IB hosts 120, 124. Further, an SM 206 (in FIG. 2) is used to configure internal forwarding tables of an IB switch 116 via an SMA 302 (in FIG. 3). As such, when establishing an IB LAG, relative to an ethernet LAG, the SM must be notified so that it can configure one or more IB switches 116. An IB switch routes IB packets from one IB link to another IB link in a same IB subnet, such as within each of subnets 202, 204 in FIG. 2. An IB router can route packets between the subnets 1, 2 202, 204 in FIG. 2.

Figure 2:
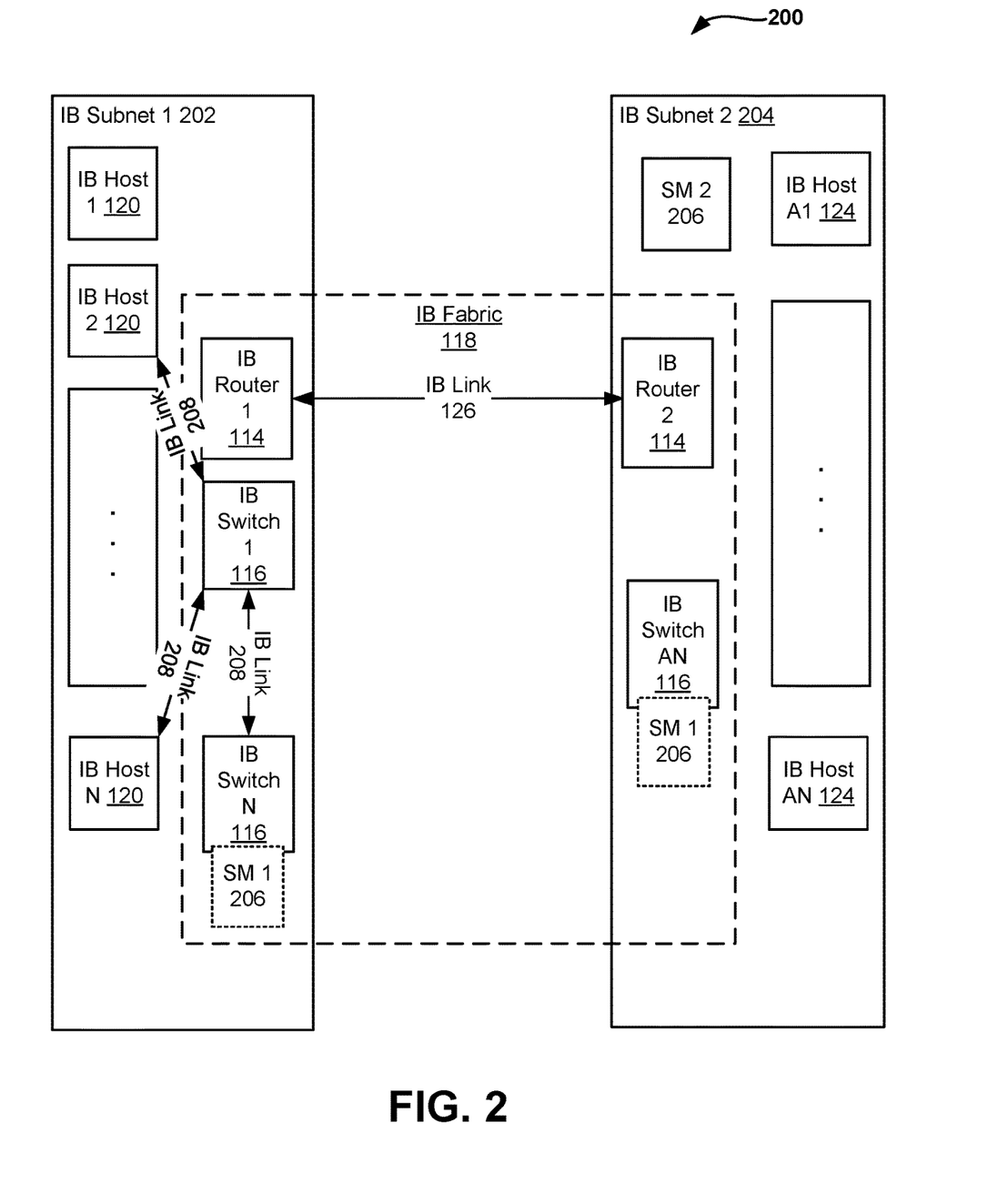
FIG. 2 illustrates IB management aspects of a system for IB LAG in IB networks having multiple subnets, according to at least one embodiment.
Figure 3:
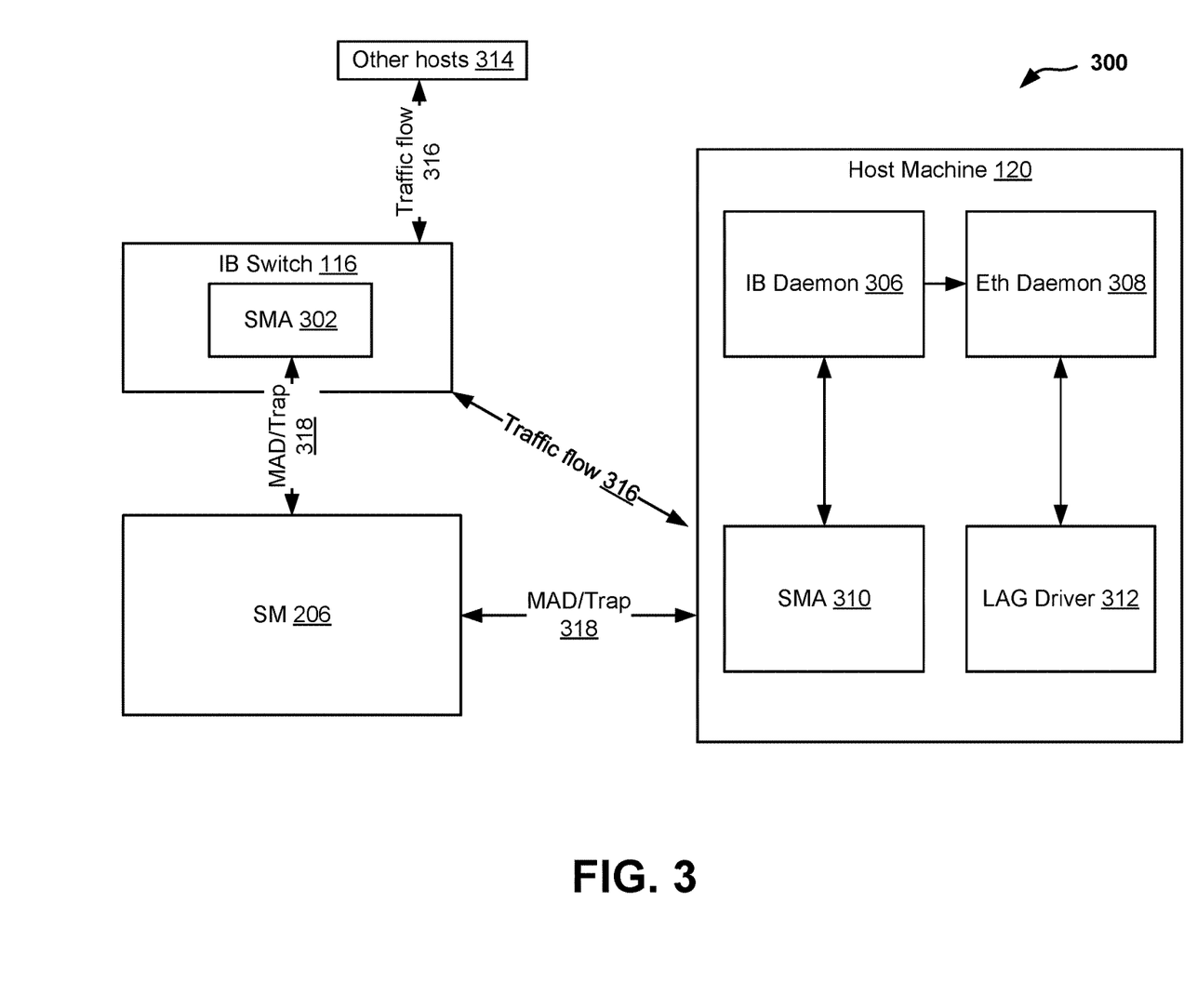
FIG. 3 illustrates further aspects of a system for IB LAG in IB networks using a subnet manager (SM) and subnet management agent (SMAs), according to at least one embodiment.

Therefore, in at least one embodiment, the system and method herein allow establishing, modifying, and monitoring of an IB LAG through an SM 206 (in FIG. 2) and at least one subnet management agent (SMA) (such as, SMA 302 in FIG. 3 and the associated description). In doing so, an IB LAG provides load-balancing in the IB network 102 by using a floating Media Access Control (MAC), also referred to as a virtual network address herein. Further, one or more IB host 1-N 120 may be computer platforms executing an Operating System (OS) to control one or more IB network adapters having one or more IB ports. A host is used interchangeably with a host machine to describe an IB or ethernet host unless stated expressly otherwise using preceding text IB or ethernet, where an IB host is exclusively within an IB network and an ethernet host is exclusively within an ethernet network. Further, such exclusivity does not restrict IB to ethernet communications as described throughout herein.

In FIG. 1, IB aspects of interconnect devices 112 may represent an IB fabric 118 and can at least include multiple IB switches 116 and one or more IB routers 114. Such an IB fabric 118 allows one or more IB hosts 120, 124 to communicate within a subnet or across subnets over one or more designated IB links 126. Even though illustrated via IB routers, an IB link can couple together IB switches. An IB link 126 is an abstraction that may include queue pairs (QPs) that bring together a source IB host machine and destination IB host machine for communication with each other. These IB host machines may be within a same subnet or in different subnets, as described further with respect to at least FIG. 2.

While in abstraction, an IB link 126 may be bound to a physical IB port of an IB host 120. Relative to ethernet LAG, an IB LAG that is provided for an IB network 102 supports interface (such as via ethernet or IP over IB 128) with an ethernet network 104 using at least an IB gateway 108. A further ethernet gateway 110 can be provided to communicate with the IB gateway 108 in such interconnect arrangements. The IB LAG can be enabled for at least two ports of the one or more IB host machines 1-N 120 to A1-AN 124.

In at least one embodiment, different from the ethernet-based LACP approach, a system 100 that includes an IB network 102 is enabled for IB LAG via an SM 206 and at least one SMA 302 that communicate with each other to establish and modify an IB LAG. For example, the SM 206 includes a mapping of at least one virtual network address to two or more physical network addresses of two or more physical IB ports of at least one host 120. The SMA 302 is able to communicate, such as receive, configuration information with the SM 206. For example, the SM 206 provides configuration information to one or more SMAs of one or more IB devices between the SM and the host 120. The configuration information can enable at least one of the IB devices (such as an IB switch 116) to configure its internal forwarding table based in part on the mapping. This configuration information, by virtue of configured forwarding tables in the IB switches, can enable a host machine 120 to communicate with other host machines 124 (or at least host machines within the same subnet 202; 204) using the at least one IB switch 116 and the at least one virtual network address.

For an IB network 102, global identifiers (GIDs) may be associated with one of the interconnect devices 112, such as an IB gateway 108, to support communication between an IB network and other protocol networks, including ethernet networks 104. Further, a GID is a 128-bit number used to identify an IB port on one or more network adapters of one or more IB host machines 120, on one or more IB routers 114, or on one or more IB gateways 108. The GIDs may be distributed for the IB ports via the SM 206. The GID may include an LID by virtue of a GID-to-LID mapping in the SM 206. A first portion of a GID (such as the first 64 bits) may be an assigned Subnet ID for the IB port, while a second portion of the GID (such as a second 64 bits) is the IB port's assigned GUID (global unit identifier). In at least one embodiment, an SM assigns a same Subnet ID, which may be a GID Prefix or Subnet Prefix, to every port within its subnet.

An IB host machine or node 120 can initiate traffic flow through one of the IB gateways 108, IB switches 116, or IB routers 114. For IB communication, an SM provides respective LIDs for respective ports within respective IB host machine to be used in communication between the IB host machines. Between subnets, a destination GID may be used from an IB host machine to query a destination LID of a destination port for a destination host machine. Once a destination LID is provided, IB packets for the IB communication can be communicated using the destination LIDs and GIDs.

In at least one embodiment, for changes in an IB device, like a change in configuration, including a cable being dropped, an ethernet link being disabled, or an appliance being powered off, the GIDs may be reassigned via the SM 206. The remaining IB gateways 108 and network adapters of the IB fabric 118 may handle traffic after such changes. However, for communicating between IB hosts 120, such a change may not be noticed. For example, the same GID and LID can remain as initially provided.

In at least one embodiment, FIG. 2 illustrates IB management of a system 200 for IB LAG in IB networks having multiple subnets 1, 2 202, 204. The system 200 details further aspects of the system 100 in FIG. 1. For example, IB routers 1, 2 114 enable traffic between two or more IB subnets 1, 2 202. The IB routers 1, 2 114 are part of the IB fabric 118 and support expanding an IB network to include over 40,000 IB ports in multiple IB hosts 120, 124. Further, separation and fault resilience between the IB subnets 1, 2 202, 204 may be supported in such a topology. The IB routers 1, 2 114 allow connection to different subnet topologies used by different subnets 202, 204. The IB switches 1, N 116 are different in that they support IB packet routing from one IB link to another IB link (such as between IB links 208) that are within a subnet 202; 204. Therefore, each subnet can include multiple IB switches 116.

In at least one embodiment, each subnet 202; 204 includes a respective SM 206. The SM 206 may be a centralized software service that runs on an IB switch N 116. The SM 206 performs functions for discovery of all connected ports and configures all the IB devices (such as IB routers 114 and other IB switches 1, AN 116) in an IB fabric 118. The SM 206 controls the port arrangements for traffic flow that occurs between the host machines 120, via the IB switches 116 within a subnet 202; 204, for instance. The discovery and configurations of port arrangements are therefore enabled by the SM 206 to support traffic flow between those active ports of relevant IB host machines 120, 124 via the one or more IB switches 116. The SM 206 also applies configurations relating to network traffic, including for Quality of Service (QoS), routing, and partitioning of the IB devices in an IB fabric 118.

While the SM 206 may be used to discover and configure IB devices to enable traffic flow between those device, the forwarding between the subnets 202, 204 may be performed using GRH (global route header) lookup. In at least one embodiment, an IB router 114 includes capabilities for removal of an L2 LRH (local routing header), for referencing a routing table using a GID from the GRH, and for providing a new LRH, according to a destination and the routing table. In at least one embodiment, a destination LID in a new LRH can be provided using the simplified GID-to-LID mapping. For example, the LID can be composed of bits from the GID and removes a requirement for Address Resolution Protocol (ARP) in support of interfacing between the IB network and an ethernet network.

In at least one embodiment, FIG. 3 illustrates further aspects of a system 300 for IB LAG in IB networks using a subnet manager (SM) 206 and subnet management agents (SMAs) 302, 310. In at least one embodiment, the IB ports in an IB LAG can be assigned a same floating MAC or virtual network address. This ensures that load-balancing in an IB network can be achieved between the IB ports at least because traffic 316 between one or more host machines 314 can be directed to an available IB port of a host machine 120 without having to specify the IB port. From a host machine's 120 point of view, the communication it is involved in is ethernet communication, whereas the communication can occur over the IB network.

Therefore, in at least one embodiment, FIG. 3 illustrates the use of an SM 206 to configure ports for a nearest IB switch 116 relevant to at least one host machine 120. This enables all traffic to a grouping of ports in a host machine 120 to be sent to the host machine 120 according to virtual network address designated in an IB LAG and provided in a forwarding table of the IB switch 116. The SM 206 is not involved in such traffic flow between host machines through one or more IB switches 116 after the configuration is provided.

A benefit from this arrangement is that, instead of sending LACP packets between peers, as in ethernet LAG, an LACP software service, such as an ethernet daemon 308, can communicate with an IB daemon 306, representing an IB software service. Such communication can cause one or more SMAs to respond to management datagram (MAD) messaging of an SM 206 using trap messaging for instance. In at least one embodiment, however, the IB daemon 306 may include a set MADs that are used for managing LAG ports by the SM 206. For example, a MAD may be provided to include LAG port information, such as LIDs, representing physical network addresses of two or more physical IB ports of at least one IB switch 116 and virtual addresses that associate together two or more of such LIDs.

In at least one embodiment, therefore, an IB software service (such as the IB daemon 306) of the host machine or of an endpoint 120 can enable communication between the SM and the SMA using MAD messaging. The IB software service can enable further communication with an LACP software service (such as the ethernet daemon 308) of an ethernet service. This further communication is to initiate or update an IB LAG mode for the two or more physical ports that are now configured as IB ports. The traffic flow may be marked (and is destined) for the at least one virtual network address 412 (in FIG. 4) of a LAG net device 404, but at least by virtue of the IB LAG mode, can be routed to at least one of the two or more physical ports 408, 410 (in FIG. 4) in the LAG mode. To the host machines 120, therefore, the physical ports 408, 410 may be seen as ethernet ports and the LAG driver 312 is seen as an ethernet LAG driver, but the ethernet ports can be configured as IB ports and are further configured to be in an IB LAG mode.

In at least one embodiment, one or more MADs can be sent between the SM 206, the host machine 300, and the IB switch 116 (via their respective SMAs). In the host machine 300 and the IB switch 116, appropriate SMAs 302, 310 may be used. An IB daemon 306 communicates with the SMA 310. In at least one embodiment, an SM 206 is configured with a subnet to enable the SM 206 to monitor the subnet for any changes. This may be a monitoring phase for the SM 206. Such changes may include changes in the IB subnet of an IB network, including an IB link failure or an IB device being added or removed. In at least one embodiment, for a subnet that includes an IB gateway for communication to an ethernet network, changes from the ethernet network may be communicated to the underlying SM of that subnet.

In at least one embodiment, in the monitoring phase, each IB device in a subnet may forward a trap message to the SM 206. For example, the SM 206 may notify all IB devices of a monitoring phase and the IB devices may response by trap message or messaging to the SM. The SM 206 can reconfigure its subnet, including to allow rerouting of traffic to certain ones of the IB devices, such as IB routers, IB switches, and the endpoints, including to the host machines 120, 124 illustrated. This can include ensuring load-balancing between all source and destination IB devices.

In at least one embodiment, the MAD messaging from the SM 206 allows trap messaging to be sent back to the SM 206. The trap messaging may include notifying the SM of a LAG mode for the two or more physical IB ports; requesting for the at least one virtual network address to be allocated for the two or more physical IB ports under the LAG mode; notifying the SM about a change in the LAG mode, the change including one of addition or removal of the two or more physical IB ports and of other physical IB ports; or notifying about disabling the LAG mode.

In at least one embodiment, in the monitoring phase, an SM 206 can monitor a subnet for changes by communicating with respective SMAs, such as the SMAs 302, 310 illustrated in the IB switch and the host machine in FIG. 3. The SMAs are, however, in every IB device to enable such communications. Further, using at least the trap messaging, the SMAs communicate the above-referenced changes, such as changes in related ports (state changes) and connections and disconnections of IB devices or IB links, to the SM 206 of a subnet. The trap messages can be sent to alert about events and can include a notice attribute providing details of such events. Therefore, trap messages herein are defined to communicate events for physical IB ports as described in connection with FIG. 3 and MAD messaging may provide configuration information to enable the at least one IB switch to configure a forwarding table based in part on a mapping provided from the SM 206 of a subnet. This enables a host machine 120 to communicate with other host machines that is at least within the same subnet using the at least one IB switch and the at least one virtual network address.

In at least one embodiment, the IB daemon or software service 306 can communicate with the SMA 310 for sending MAD messages to the SM 206 and for receiving responses from the SM 206. Based at least in part on trap messaging, the SM 206 can maintain information of the physical IB ports in a subnet. Further, the SM 206 can include a mapping of two or more physical IB ports in a subnet to a LAG port, represented as a floating MAC or a virtual network address, whether newly created or whether updated from a previously created LAG port. There may be multiple such LAGs or lag ports to group different physical IB ports. In at least one embodiment, a LAG port may include physical IB ports that are exclusive with the LAG port.

In at least one embodiment, when receiving a new request to add a physical IB port to a new or existing LAG, the SM 206 can make certain configuration checks for determining that the physical IB port can join to the LAG. Such configuration checks may be required configuration checks. For example, to establish or modify a LAG, a request may be made by one or more host machines 120 via its respective SMA 310. In at least one embodiment, it is possible to coordinate for an IB LAG and an ethernet LAG using the IB daemon 306 communicating with the ethernet daemon 308. The host machine may only see the ethernet daemon 308, whereas the ethernet daemon 308 communicates to the IB daemon 306 to enable aspects for the IB communication.

In at least one embodiment, responsive to such a request, an SM 206 can allocate a virtual network address to be used by a new LAG port for a host machine 120. To modify an existing LAG, an SM 206 can simply change its mapping of an existing virtual network address used by an existing LAG port to include further physical IB ports or to remove previously mapped physical IB ports. The SM 206 can then make all the required IB device configurations for the new or updated LAG by sending MADs to the IB devices in communication between the host machine and other host machines, such as to the SMAs of the IB switches 116. In at least one embodiment, the MADs can include configuration information for configuring an IB switch to indicate that a new LAG is in effect with two or more physical IB ports, to notify the IB switch about changes in an existing LAG, or to remove a LAG altogether.

Figure 4:
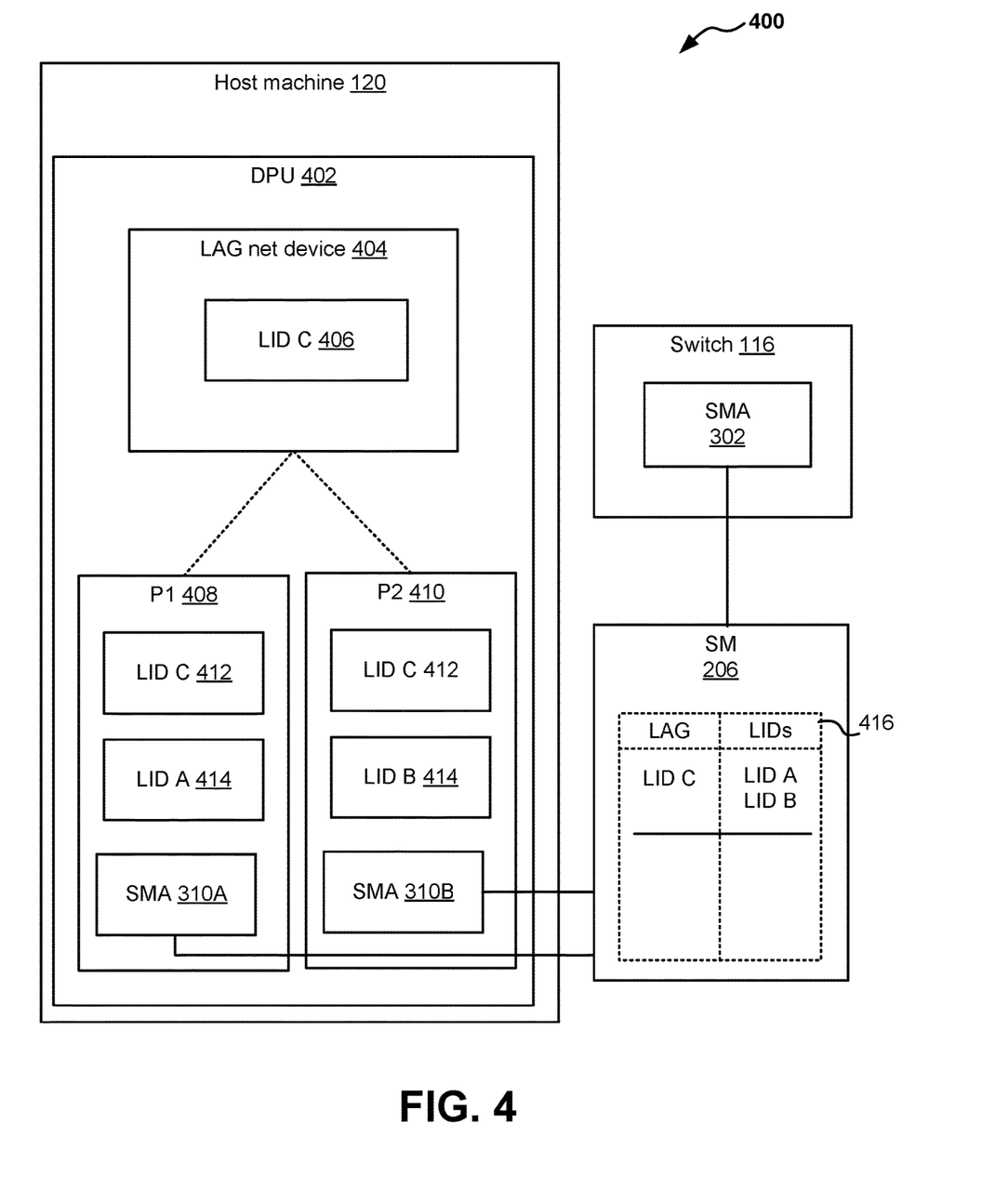
FIG. 4 illustrates still further aspects of a system for IB LAG in IB networks supported by at least a gateway in a subnet, according to at least one embodiment.

In at least one embodiment, FIG. 4 illustrates still further aspects of a system 400 for IB LAG in IB networks supported by at least a data processing unit (DPU) 402 in a subnet. In one example, however, instead of a DPU 402, one or more of a hardware devices, a software, or a firmware executable on a central processing unit (CPU) may be used to support IB networks. A DPU may be a programmable CPU that is capable of large data stores and transactions compared to a CPU. In at least one embodiment, the DPU 402 may be associated with a network adapter of a host machine 120. The DPU 402 may be associated with an IB daemon 306 and may store and use at least part of the configuration information indicating the virtual network address associated with a LAG, from an SM 206. This allows for traffic to the host machine 120 to move between the physical IB ports P1 408, P2 410 of the network adapter (of a host machine) and other ports of other host machines, through the at least one switch 116, even though such IB packets are routed the virtual network address LID C 412 of the LAG net device 404.

In at least one embodiment, the SM 206 can store mapping information 416 to generate configuration information to be communicated via MADs 318 to other IB devices in a subnet. IB links are established between the host machine 120 and other host machines 314 via an IB switch 116 using the configuration information. Further, MADs 318 may be communicated to an SM 206 through such IB links but using individual ports P1 408 and its associated SMA 310A or P2 410 and its associated SMA 310B of the host machine 120. Differently, traffic flow 316 that is for data traffic may be provided between a LAG net device 404 of a host machine 120 and other IB ports of other host machines 314 using the IB links, once a LAG mode is in effect for a LAG net device 404. Whereas the SM 206 communicates MADs to respective SMAs of respective IB devices using their respective physical ports, the host machines communicate traffic to other host machines using the LAG net device. Therefore, even if illustrated as a direct connection, the SM 206 may communicate with SMAs 310A, 310B via multiple IB routers and/or IB switches that are in an IB link to reach the DPU 402 of a host machine 120 (or a switch).

In at least one embodiment, each physical IB port P1, P2 408; 410 is associated with an LID A, B 414 and with a respective SMA 310A, B. At the time of initiating the IB LAG, a host machine 120 having the DPU 402 communicates a request for an IB LAG with the SM 206 through an IB port 408; 410. This may be a MAD message or can be a trap message. The SM 206 includes or updates a mapping 416 of at least one virtual network address 412 to two or more physical network addresses 414 of two or more physical IB ports 408, 410 of a host machine 120. The SM 206 may provide a virtual network address LID C 412 to be associated with the two or more physical IB ports 408, 410. The virtual network address LID C 412 may be associated with a LAG net device 404 and may be stored or registered 406 within the DPU 402. Therefore, the SM 206 communicates with the SMAs 310A, B of the physical IB ports 408, 410 using their LIDs A, B 414 to inform the DPU 402 that the specific physical IB ports 408, 410 are bonded together as a team with a single virtual network address LID C 412.

In at least one embodiment, FIG. 4 also illustrates that in the case of an IB link failure, an SM 206 can check if a physical IB port 408, 410 that was part of an IB LAG has failed. In the case that it is confirmed that a physical IB port that was part of an IB LAG has failed, then the SM 206 can reconfigure one or more IB switches to cause those one or more IB switches to update their respective internal forwarding table. This allows for a load-balancing action of traffic between the active physical IB ports.

FIG. 4 also illustrates that when a physical IB port 408; 410 is added to an IB LAG, the SM 206 sends MADs to the physical IB port 408; 410 via its respective SMA 310A; 310B. The SM 206 may not be load-balanced over the IB LAG, such as not sending the MADs to the virtual network address LID C 412 but using the specific IB port's physical IB address LID A, B 414. This is required for the SM 206 to be able to monitor each of the physical IB ports 408, 410 separately, although the ports are bonded together. Moreover, in at least second generation IB (IBg2), the MADs can have the original port's physical port address, such as their MAC address as the LID, in their source/destination MAC address header fields (depending on the direction of communication). The MADs sent in this process will not use the virtual network address (floating MAC address) of the LAG so that the IB packets intended for the physical IB port 408; 410 reaches that port instead of a redundancy action where the virtual network address allows any physical IB port of the LAG to receive the IB packet.

In at least one embodiment, FIG. 4 also illustrates that when a physical IB port goes down or when a physical IB port is removed from an IB LAG, the SM 206 becomes aware by the regular discovery of its connected IB devices. The SM 206 can reconfigure one or more switches by configuration information sent to the one or more switches to cause them to update their respective internal forwarding tables. At the time of joining an IB LAG, from the time an SMA 310A; 310B of a physical IB port 408; 410 sends a MAD to the SM 206 with a requests to join a LAG, till the time the SM 206 responds with a virtual network address (floating MAC) LID C 412 to be assigned to the physical IB port 408; 410, an operational state of the physical IB port 408; 410 can be set to "initializing" by a LAG driver 312. This is done to show that the physical IB port 408; 410 is in a middle of configuration process and will be changed to "UP" status as soon as this process ends.

In at least one embodiment, the two or more physical IB ports 408; 410 are IB ports and the IB ports are placed in a LAG mode by their association together using a virtual network address LID C 412. This enables traffic, as part of the communication between the host machine 120 and the other host machines in at least the same subnet to use the mapping of the at least one virtual network address LID C 412 to the two or more physical network addresses of the two or more physical IB ports 408; 410. In at least one embodiment, the IB router 114 and an IB gateway can support communication to host machines 120; 124 across subnets using the virtual network address and the IB switches within each subnet.

In at least one embodiment, the SM 206 includes an interface to receive administrator input. Such an interface is at least defined by an ability to send and receive MAD messaging and to receive trap messaging, as described herein. The SM 206 is able to perform configuration updates to its internal mapping and is able to cause configuration updates to one or more IB switches by configuration information sent to such one or more IB switches. For example, an administrator input may be a request through a host machine 120 that is communicated to the SM 206 via MAD messaging. The administrator input can place the IB ports into the LAG mode using the SMAs that communicate between the host machine 120 and the SM 206. Further, the SM 206 is enabled to assign the at least one virtual network address to the two or more physical network addresses LID A, B 414 of the two or more physical ports 408; 410.

In at least one embodiment, the SM 206 is therefore configured to receive a request to add a port of the two or more physical ports or of other physical ports to a LAG mode. The ports may be designated IB ports by virtue of being used with an IB network. The SM 206 can perform configuration checks to determine that the port of the two or more physical IB ports or of the other physical IB ports is available to join the LAG mode. The configuration checks may include verification of an initial status to such one or more physical IB ports during discovery previously conducted by the SM 206. The SM 206 can update or establish the LAG mode in response to the request. For example, the SM 206 can allocate the at least one virtual network address (LID C) 412 to the two or more physical network addresses (LID A, B) 414 of the two or more physical IB ports 408 or of the other physical ports 410. The SM 206 can communicate the configuration information to include the allocation by the SM 206, using MAD messaging, to the at least one IB switch 116, via its SMA 302.

Once the configuration information is received, the IB switch 116 can configure its internal forwarding tables to reflect that LID C 412 is to be used with LID A, B 414 of the respective IB ports 408, 410 for further communication with other hosts, such as within the same subnet or to other subnets via an IB router or to different host machines that need not be in the IB networks via a gateway. Traffic to a host machine having IB ports that are part of the LAG are sent to the host machine using the LID C 412 address but can reach both IB ports 414 to enable redundancy.

In at least one embodiment, load-balancing of traffic may be performed using the IB LAG mode. For example, load balancing of traffic between the two or more physical ports of a host machine may be provided by joining the two or more physical IB ports to an IB LAG mode. For this, communication, between the SM 206 and at least one SMA 302 (such as for a switch 116), may include configuration information that includes the physical IB ports to be added to a LAG mode. The communication can use MAD messaging and can reference the physical IB ports, such as adding physical IB ports to a LAG mode that exits or joining physical IB ports to a LAG mode.

In at least one embodiment, the system 300 or 400 in at least FIGS. 3 and 4 include one or more processing units of an SM 206 to communicate configuration information with at least one SMA 302, such as an SMA of at least one IB switch 116 (but also to SMAs 310A, B associated with a network adapter of a host machine 120). The at least one SMA 302 is therefore associated with at least one IB switch 116 and with a host machine 120 by virtue of the IB ports in the host machine 120 being brought together in the IB LAG. The configuration information from the SM 206 can enable the at least one IB switch 116 to configure its internal forwarding table based in part on a mapping of at least one virtual network address to physical network addresses of two or more physical IB ports of the host machine 120. Further, the configuration information can enable the host machine 120 to communicate with other host machines in the subnet or outside the subnet using the at least one IB switch 116 and using the at least one virtual network address.

In at least one embodiment, such systems 300, 400, using the one or more processing units of the SM, are further configured to monitor individual ones of the two or more physical ports using trap messaging from the at least one SMA. This enables changes for the host machine and the at least one IB switch, via the configuration information, based in part on a change indicated in trap messaging from the at least one SMA. For example, the trap messaging may indicate an intent to join or to be removed from a LAG. In a further example, the trap messaging may indicate a failure in a physical port so that it needs to be removed from a LAG.

Figure 5:
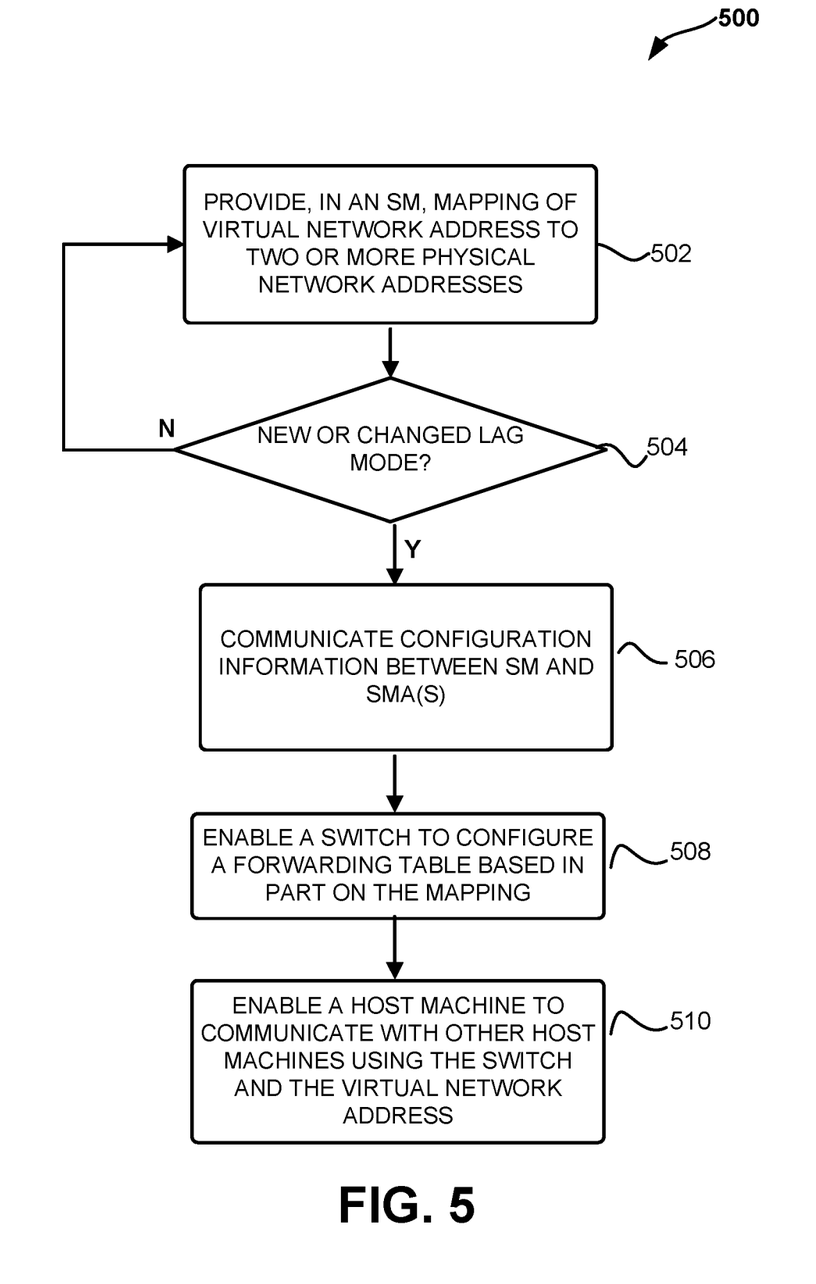
FIG. 5 illustrates a process flow for IB LAG in IB networks, according to at least one embodiment.

In at least one embodiment, FIG. 5 illustrates a process flow or method 500 for IB LAG in IB networks. The method 500 includes providing (502), in an SM, a mapping of at least one virtual network address to two or more physical network addresses of two or more physical ports of a host machine. A verification (504) may be performed in the SM to check if the two or more physical network addresses are associated with an IB LAG mode to be changed or if a new IB LAG is to be set up that places the underlying two or more physical ports in a IB LAG mode. When already in a IB LAG mode, information may be provided in response.

For a new IB LAG mode or a change in the IB LAG mode, the method 500 includes communicating (506) configuration information with the SM using at least one SMA associated with at least one of the two or more physical ports. In at least one embodiment, the configuration information is provided to the SMA of a host machine and is provided to the SMA of a switch. The method 500 includes enabling (508), using the configuration information, at least one switch to configure a forwarding table based in part on the mapping. Further, the method 500 includes enabling (510) a host machine to communicate with other host machines using the at least one switch and the at least one virtual network address.

Figure 6:
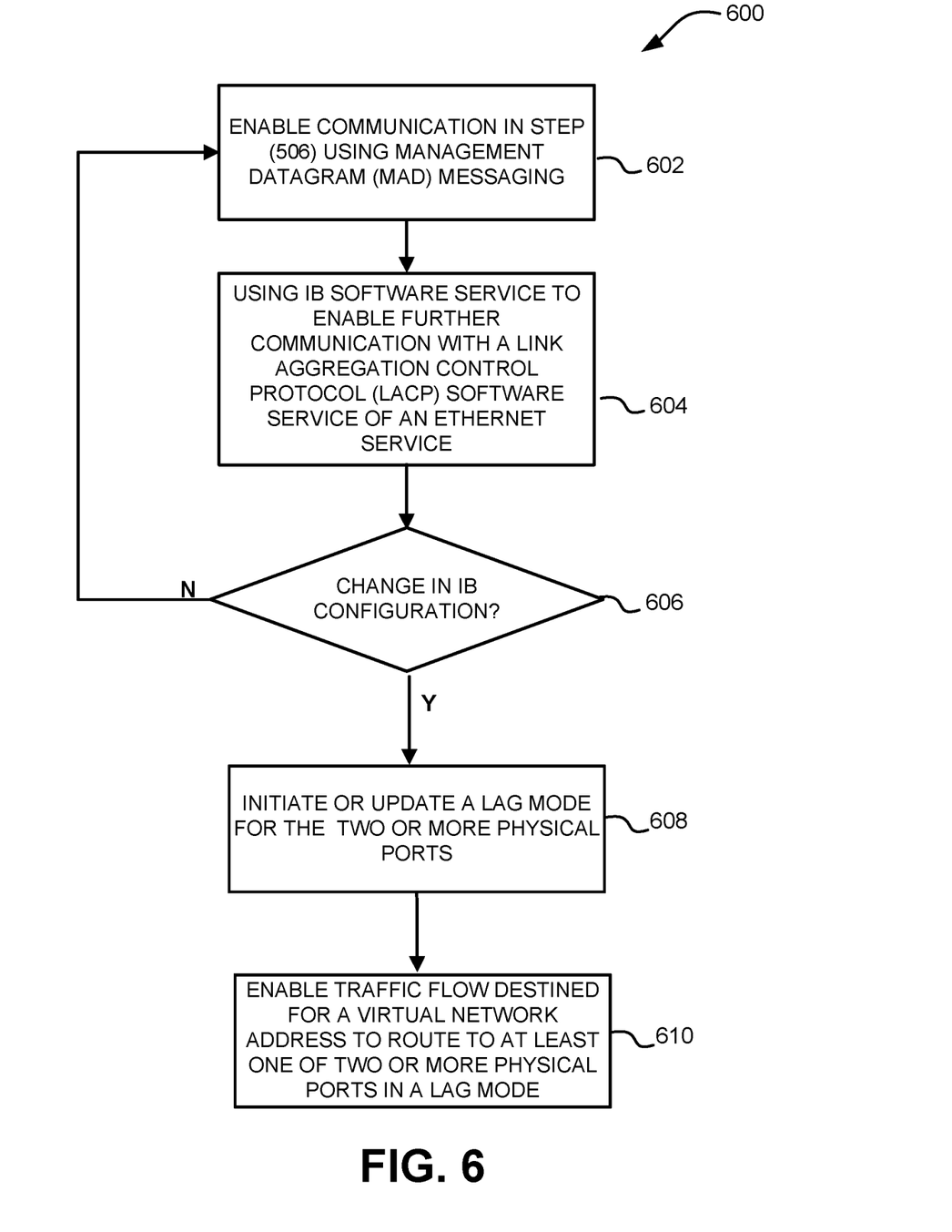
FIG. 6 illustrates process flow for an IB software service to support IB LAG in IB networks, according to at least one embodiment.

In at least one embodiment, FIG. 6 illustrates process flow or method 600 for an IB software service to support IB LAG in IB networks. The method 600 includes enabling (602) communication in step 506 of method 500, between the SM and the SMA, via MAD messaging. The method 600 includes using an IB software service of the host machine or of an endpoint to enable further communication with an LACP software service of an ethernet service. A verification (606) is performed in the method 600 to determine if a change in IB configuration has occurred. For example, the change may be addition or removal of IB ports to a LAG mode or that a LAG mode is initiated. The further communication allows initiation or updating (608) a LAG mode for the two or more physical ports with the host machine being oblivious to the IB network or treating an IB network as an ethernet network. Further, the method 600 enables (610) traffic flow destined for at least one virtual network address to route to at least one of the two or more physical ports in the LAG mode.

In at least one embodiment, the method 500 or 600 is so that the MAD messaging allows a response that includes trap messaging for notifying the SM of a LAG mode for the two or more physical ports; trap messaging requesting for the at least one virtual network address to be allocated for the two or more physical ports under the LAG mode; trap messaging for notifying the SM about a change in the LAG mode, the change comprising one of addition or removal of the two or more physical ports and of other physical ports; or trap messaging notifying about disabling the LAG mode.

Figure 7:
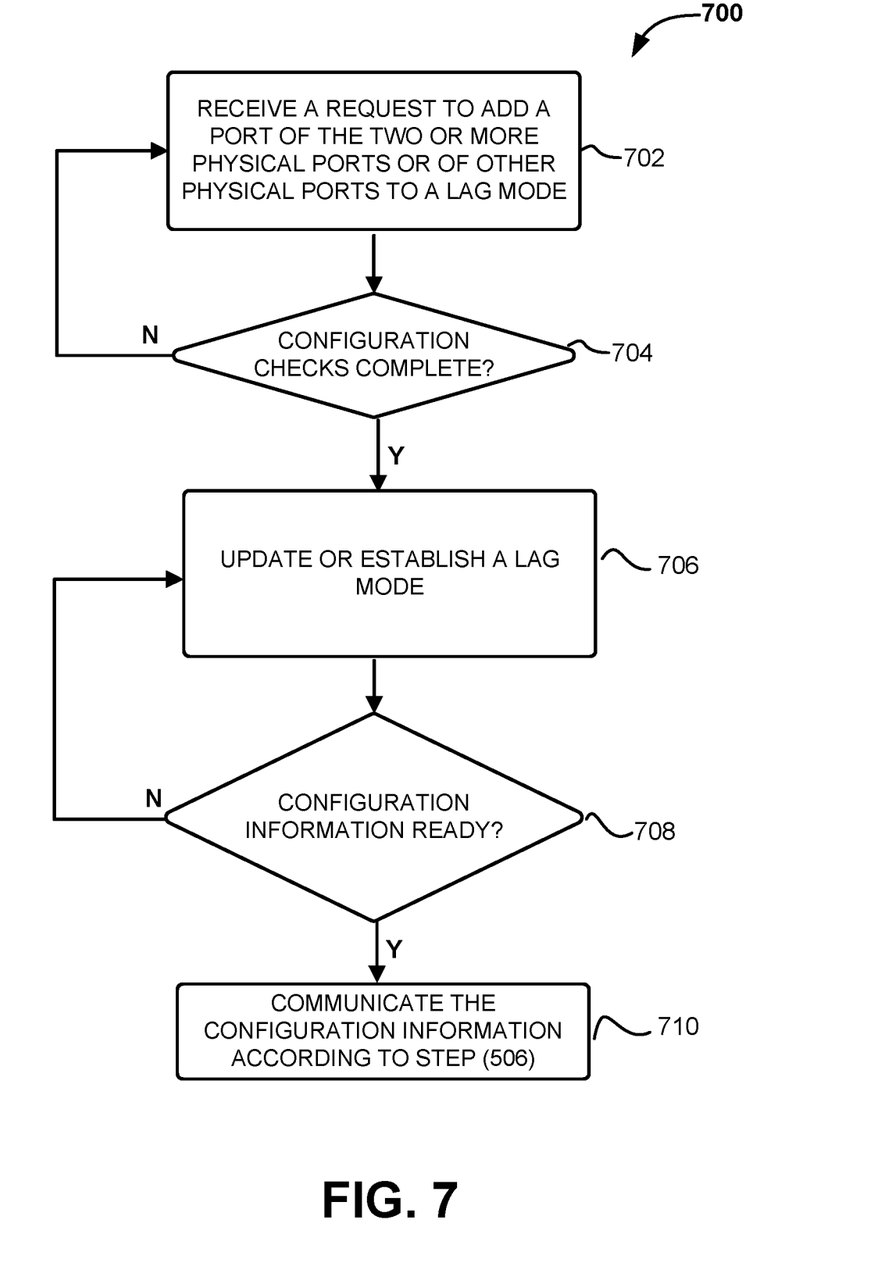
FIG. 7 illustrates a process flow for a system to add ports in a IB LAG in IB networks, according to at least one embodiment.

In at least one embodiment, FIG. 7 illustrates a process flow or method 700 for a system to add ports in a IB LAG in IB networks. The method 700 includes receiving (702), in an SM, a request to add a port of the two or more physical ports or of other physical ports to an IB LAG mode. The method 700 includes performing configuration checks to determine that the port of the two or more physical ports or of the other physical ports is available to join the LAG mode. The method 700 includes verification (704) that the configuration checks are completed. The method 700 can include updating or establishing (706) a LAG mode. To do so, the SM allocates the at least one virtual network address to the two or more physical network addresses of the two or more physical ports or of the other physical ports. This is part of an internal mapping in the SM. The method 700 includes verifying (708) that configuration information is complete. This may be by completing the LAG establishment or update in step 706. The method 700 includes communicating (710) the configuration information according to step 506 in method 500. For example, the step of communication (710) is using MAD messaging and is to include communicating the allocation by the SM to at least one switch.

In at least one embodiment, one or more of such methods 500-700 can include checking, by the SM, that the two or more physical ports are part of a LAG mode and reconfiguring the at least one switch to enable load balancing traffic between the two or more physical ports. In at least one embodiment, one or more of such methods 500-700 can include adding a further port as part of the two or more physical ports to a LAG mode. Then communicating may be performed, between the SM and the at least one SMA, for the configuration information that can include the further port. The communication uses MAD messaging and the further port within the MAD messaging. The further port is distinct from the two or more ports subject to the load balancing of the traffic and that are already in the LAG mode. As such, the communication for control and configuration is sent directly to a physical IB port whereas the traffic between hosts is communicated between the physical IB ports as part of the LAG mode and using the virtual network address for these IB ports. In at least one embodiment, one or more of such methods 500-700 can include providing the further port's physical address in a source and destination address header field of a MAD message sent to the physical IB ports as part of the configuration information.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors.

In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. References may also be made to providing, outputting, transmitting, sending, or presenting analog or digital data. In at least one embodiment, processes of providing, outputting, transmitting, sending, or presenting analog or digital data can be accomplished by transferring data as an input or output parameter of a function call, a parameter of an application programming interface or inter-process communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system for link aggregation in a network, comprising:
a subnet manager (SM) to:
responsive to a request to add a port of two or more physical ports or of other physical ports to a link aggregation (LAG) mode, determine that the port of the two or more physical ports or of the other physical ports is available to join the LAG mode,
update or establish the LAG mode by mapping at least one virtual network address to two or more physical network addresses of the two or more physical ports or of the other physical ports of a host machine, and communicate configuration information to include the mapping by the SM, using management datagram (MAD) messaging, to at least one switch; and
at least one subnet management agent (SMA) to communicate the configuration information with the SM, the configuration information to enable the at least one switch to configure a forwarding table based in part on the mapping and to enable the host machine to communicate with other host machines using the at least one switch and the at least one virtual network address.

2. The system of claim 1, wherein the MAD messaging and trap messaging are used to perform the communication of the configuration information between the SM and the at least one SMA.

3. The system of claim 1, wherein the two or more physical ports are InfiniBand (IB) ports and wherein the IB ports are placed in the LAG mode to enable traffic as part of the communication between the host machine and the other host machines using the mapping of the at least one virtual network address to the two or more physical network addresses of the two or more physical ports.

4. The system of claim 3, further comprising:
an interface of the SM to receive administrator input to place the IB ports into the LAG mode using the SMAs.

5. The system of claim 1, wherein the SM is enabled to assign the at least one virtual network address to the two or more physical network addresses of the two or more physical ports.

6. The system of claim 1, further comprising:
an InfiniBand (IB) software service of the host machine or of an endpoint to enable further communication with a link aggregation control protocol (LACP) software service of an ethernet service, the further communication to initiate or update the LAG mode for the two or more physical ports, wherein traffic flow destined for the at least one virtual network address is routed to at least one of the two or more physical ports in the LAG mode.

7. The system of claim 6, wherein responses to the MAD comprises one or more of:
trap messaging for notifying the SM of the LAG mode for the two or more physical ports;
trap messaging requesting for the at least one virtual network address to be allocated for the two or more physical ports under the LAG mode;
trap messaging for notifying the SM about a change in the LAG mode, the change comprising one of addition or removal of the two or more physical ports and of other physical ports; or
trap messaging notifying about disabling the LAG mode.

8. The system of claim 1, wherein the SM is further configured to:
check that the two or more physical ports are part of the LAG mode; and
reconfigure the at least one switch to enable load balancing traffic between the two or more physical ports.

9. The system of claim 8, wherein the system is further configured to:
add a further port as part of the two or more physical ports to the LAG mode; and
communicate, between the SM and the at least one SMA, the configuration information including the further port, wherein the communication uses the MAD messaging and uses the further port.

10. The system of claim 9, wherein the MAD messaging includes the further port's physical address in a source and destination address header field.

11. A method for link aggregation in a network, the method comprising:
responsive to a request to add a port of two or more physical ports or of other physical ports to a link aggregation (LAG) mode, determining, by a subnet manager (SM) that the port of the two or more physical ports or of the other physical ports is available to join the LAG mode;
updating or establishing, by the SM, the LAG mode by mapping at least one virtual network address to two or more physical network addresses of the two or more physical ports or of the other physical ports of a host machine;
using management datagram (MAD) messaging, communicating, by the SM using at least one subnet management agent (SMA) associated with at least one of the two or more physical ports, configuration information to include the mapping by the SM to at least one switch; and
enabling, using the configuration information, at least one switch to configure a forwarding table based in part on the mapping, the host machine to communicate with other host machines using the at least one switch and the at least one virtual network address.

12. The method of claim 11, further comprising:
enabling, using an InfiniBand (IB) software service of the host machine or of an endpoint, further communication with a link aggregation control protocol (LACP) software service of an ethernet service, the further communication to initiate or update the LAG mode for the two or more physical ports, wherein traffic flow destined for the at least one virtual network address is routed to at least one of the two or more physical ports in the LAG mode.

13. The method of claim 12, wherein the MAD messaging allows a response that comprises one or more of:
trap messaging for notifying the SM of the LAG mode for the two or more physical ports;
trap messaging requesting for the at least one virtual network address to be allocated for the two or more physical ports under the LAG mode;
trap messaging for notifying the SM about a change in the LAG mode, the change comprising one of addition or removal of the two or more physical ports and of other physical ports; or
trap messaging notifying about disabling the LAG mode.

14. The method of claim 11, further comprising:
checking, by the SM, that the two or more physical ports are part of LAG mode; and
reconfiguring the at least one switch to enable load balancing traffic between the two or more physical ports.

15. The method of claim 14, further comprising:
adding a further port as part of the two or more physical ports to the LAG mode; and
communicating, between the SM and the at least one SMA, the configuration information including the further port, wherein the communication uses the MAD messaging and uses the further port.

16. The method of claim 15, wherein the MAD messaging includes the further port's physical address in a source and destination address header field.

17. A system comprising one or more processors of a subnet manager (SM) to:
responsive to a request to add a port of two or more physical ports or of other physical ports to a link aggregation (LAG) mode, determine that the port of the two or more physical ports or of the other physical ports is available to join the LAG mode;
update or establish the LAG mode by mapping at least one virtual network address to two or more physical network addresses of the two or more physical ports or of the other physical ports of a host machine; and
communicate configuration information with at least one subnet management agent (SMA) that is associated with at least one switch and with the host machine, the configuration information to enable the at least one switch to configure a forwarding table based in part on the mapping of the at least one virtual network address to the two or more physical network addresses of the two or more physical ports of the host machine, and the configuration information to enable the host machine to communicate with other host machines using the at least one switch and the at least one virtual network address.

18. The system of claim 17, the one or more processors of the SM are further configured to:
monitor individual ones of the two or more physical ports using trap messaging from the at least one SMA; and
enable changes for the host machine and the at least one switch, via the configuration information, based in part on a change indicated in the trap messaging from the at least one SMA.

* * * * *